United States Patent
Zisapel et al.

(10) Patent No.: US 6,249,801 B1
(45) Date of Patent: Jun. 19, 2001

(54) LOAD BALANCING

(75) Inventors: Roy Zisapel; Amir Peless, both of Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 0 days.

(21) Appl. No.: 09/115,643

(22) Filed: Jul. 15, 1998

(51) Int. Cl.[7] .................................................. G06F 13/00
(52) U.S. Cl. ............................................................ 709/105
(58) Field of Search .................................. 709/105, 217, 709/218, 219

(56) References Cited

U.S. PATENT DOCUMENTS

| | | | |
|---|---|---|---|
| 5,774,660 | * 6/1998 | Brendel et al. | 709/201 |
| 6,067,545 | * 5/2000 | Wolff | 707/10 |
| 6,070,191 | * 5/2000 | Narendran et al. | 709/226 |
| 6,078,943 | * 6/2000 | Yu | 709/105 |
| 6,182,139 | * 1/2001 | Brendel | 709/226 |

OTHER PUBLICATIONS

Brochure: "CSD A Complete Solution for Enhancing Cache Server Farm Performance", RadWare Ltd., 1997.
Brochure: "WSD–DS", RadWare Ltd., 1997.
Brochure: "WSD–NP A Powerful Global Load Balancing Solution", RadWare Ltd., 1997.
Brochure: "WSD, WSD–Pro", RadWare Ltd., 1997.
B. Gengler, "RND Server Eases Web Site Congestion", Internetwork, 7(11) 1996.
R.J. Kohlhepp, "Web Server Director Keeps Intersections Clear", Network Computing, 1997.
A. Rogers, "Easing Web Jam With Distributed Servers", Communications Week, No. 632, 1996.
J. Taschek, "A Well–Balanced Web", Internet Computing, 1998.
P. Boyle, "Web Site Traffic Cops", PC Magazine, Feb. 18, 1997.

* cited by examiner

*Primary Examiner*—Kenneth R. Coulter
(74) *Attorney, Agent, or Firm*—Finnegan, Henderson, Farabow, Garrett & Dunner, L.L.P.

(57) ABSTRACT

A method for load balancing requests on a network, the method including receiving a request from a requestor having a requestor network address at a first load balancer having a first load balancer network address, the request having a source address indicating the requestor network address and a destination address indicating the first load balancer network address, forwarding the request from the first load balancer to a second load balancer at a triangulation network address, the request source address indicating the requestor network address and the destination address indicating the triangulation network address, the triangulation network address being associated with the first load balancer network address, and sending a response from the second load balancer to the requestor at the requestor network address, the response having a source address indicating the first load balancer network address associated with the triangulation network address and a destination address indicating the first requestor network address.

8 Claims, 9 Drawing Sheets

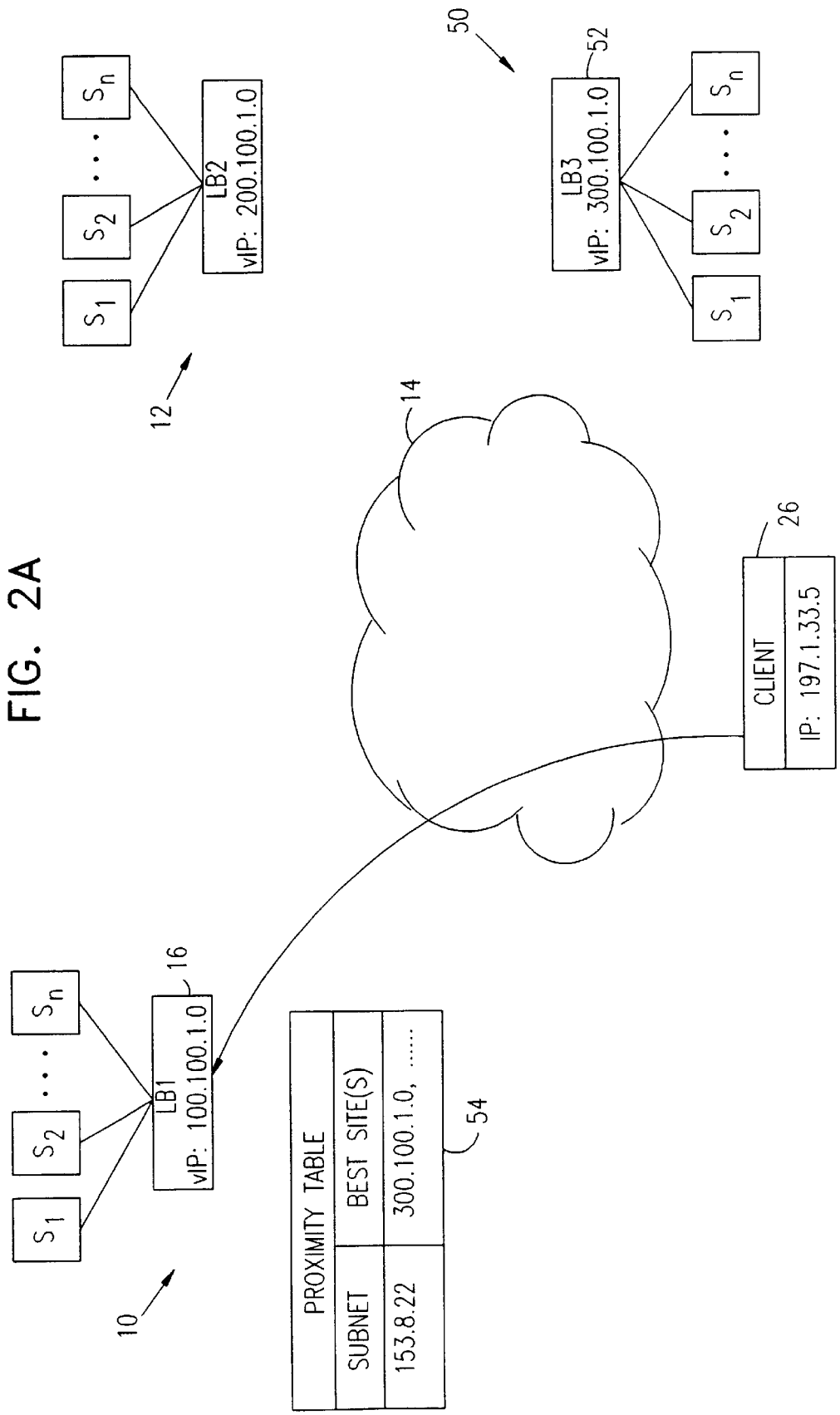

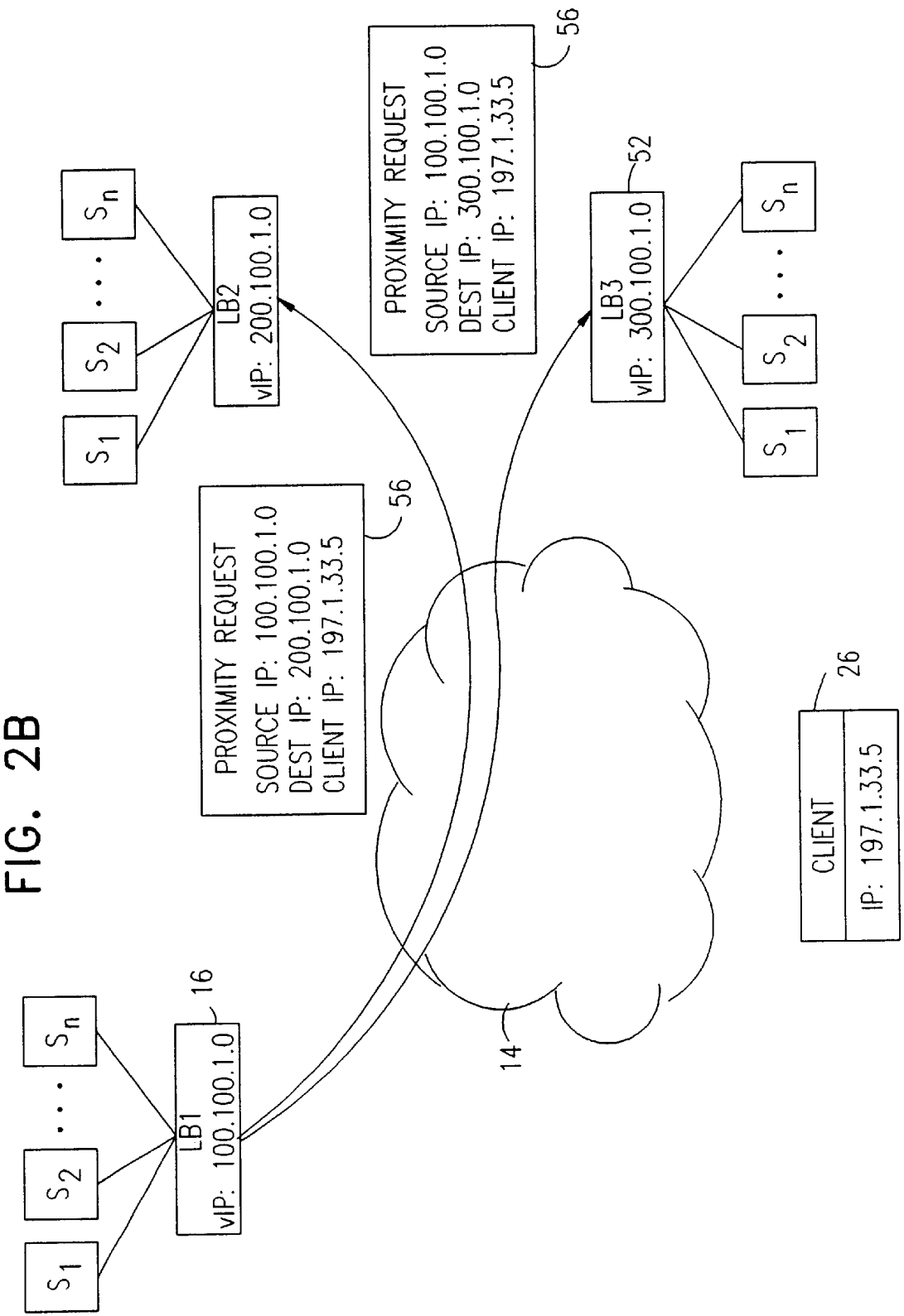

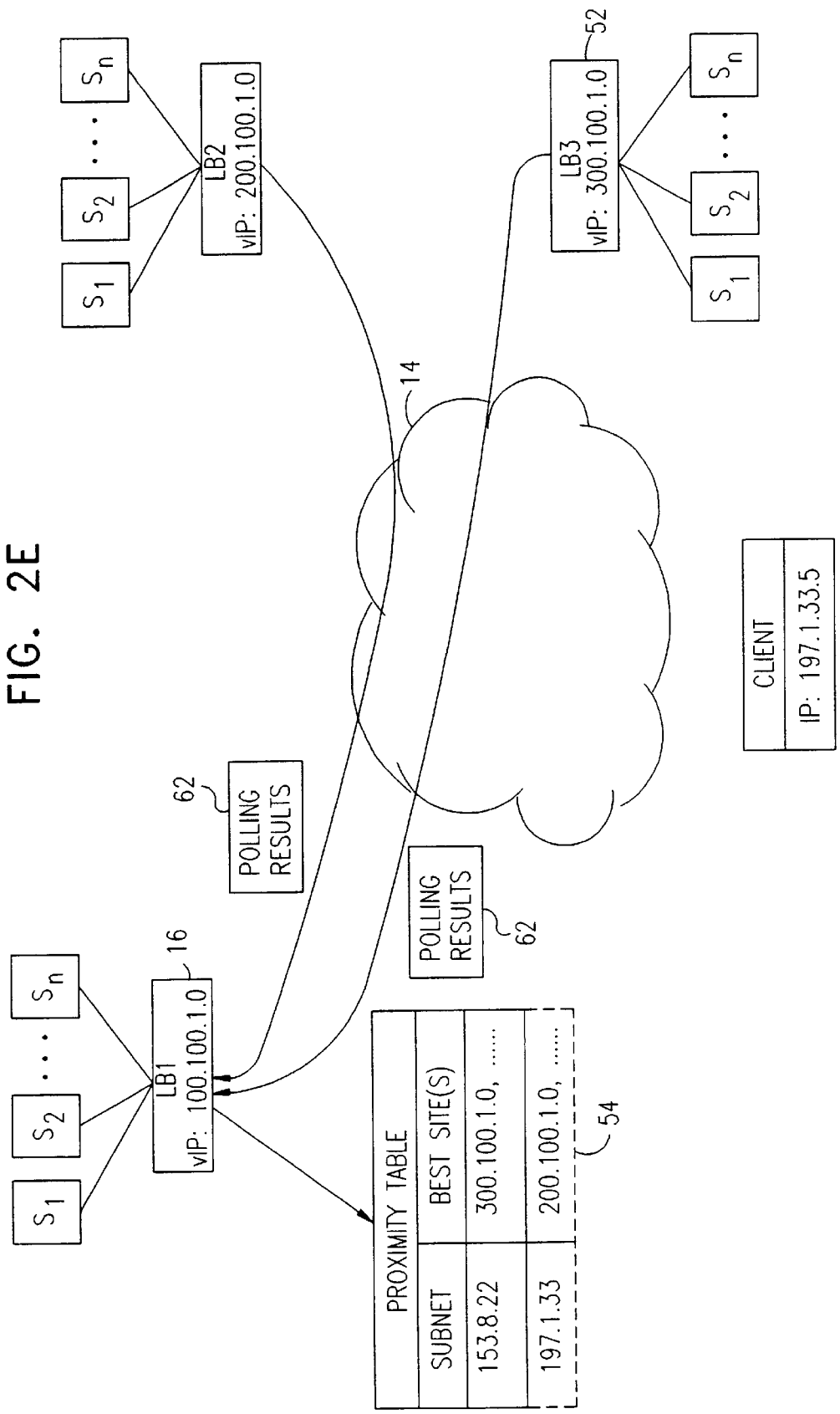

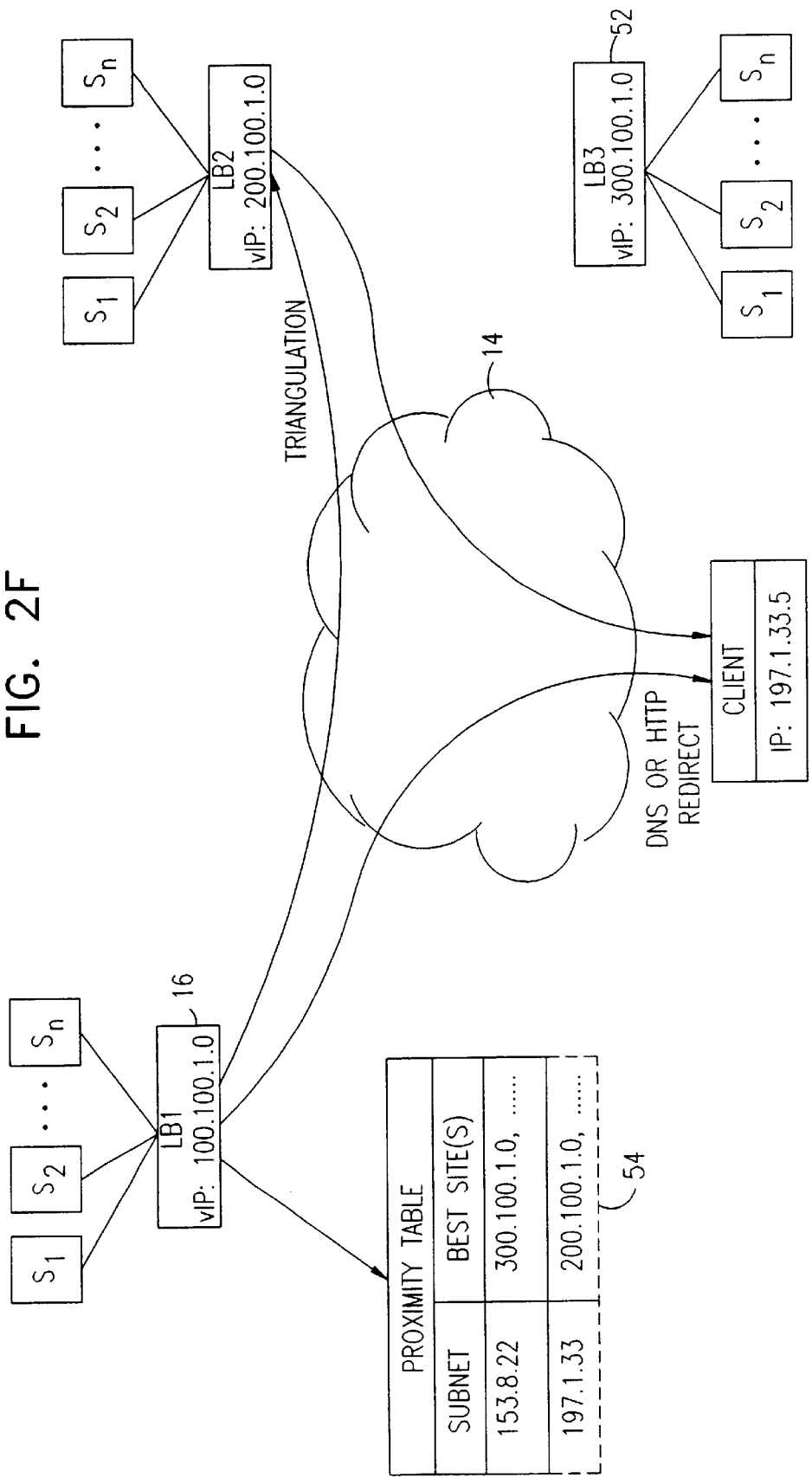

LOAD BALANCING

FIELD OF THE INVENTION

The present invention relates to computer networks in general, and in particular to load balancing client requests among redundant network servers in different geographical locations.

BACKGROUND OF THE INVENTION

In computer networks, such as the Internet, preventing a server from becoming overloaded with requests from clients may be accomplished by providing several servers having redundant capabilities and managing the distribution of client requests among the servers through a process known as "load balancing."

In one early implementation of load balancing, a Domain Naming System (DNS) server connected to the Internet is configured to maintain several IP addresses for a single domain name, with each address corresponding to one of several servers having redundant capabilities. The DNS server receives a request for address translation and responds by returning the list of server addresses from which the client chooses one address at random to connect to. Alternatively, the DNS server returns a single address chosen either at random or in a round-robin fashion, or actively monitors each of the servers and returns a single address based on server load and availability.

More recently, a device known as a "load balancer," such as the Web Server Director, commercially available from the Applicant/assignee, has been used to balance server loads as follows. The load balancer is provided as a gateway to several redundant servers typically situated in a single geographical location and referred to as a "server farm" or "server cluster." DNS servers store the IP address of the load balancer rather than the addresses of the servers to which the load balancer is connected. The load balancer's address is referred to as a "virtual IP address" in that it masks the addresses of the servers to which it is connected. Client requests are addressed to the virtual IP address of the load balancer which then sends the request to a server based on server load and availability or using other known techniques.

Just as redundant servers in combination with a load balancer may be used to prevent server overload, redundant server farms may be used to reroute client requests received at a first load balancer/server farm to a second load balancer/server farm where none of the servers in the first server farm are available to tend to the request. One rerouting method currently being used involves sending an HTTP redirect message from the first load balancer/server farm to the client instructing the client to reroute the request to the second load balancer/server farm indicated in the redirect message. This method of load balancing is disadvantageous in that it can only be employed in response to HTTP requests, and not for other types of requests such as FTP requests. Another rerouting method involves configuring the first load balancer to act as a DNS server. Upon receiving a DNS request, the first load balancer simply returns the virtual IP address of the second load balancer. This method of load balancing is disadvantageous in that it can only be employed in response to DNS requests where there is no guarantee that the request will come to the first load balancer since the request does not come directly from the client, and where subsequent requests to intermediate DNS servers may result in a previously cached response being returned with a virtual IP address of a load balancer that is no longer available.

Where redundant server farms are situated in more than one geographical location, the geographical location of a client may be considered when determining the load balancer to which the client's requests should be routed, in addition to employing conventional load balancing techniques. However, routing client requests to the geographically nearest server, load balancer, or server farm might not necessarily provide the client with the best service if, for example, routing the request to a geographically more distant location would otherwise result in reduced latency, fewer hops, or provide more processing capacity at the server.

SUMMARY OF THE INVENTION

The present invention seeks to provide novel apparatus and methods for load balancing client requests among redundant network servers and server farms in different geographical locations which overcome the known disadvantages of the prior art as discussed above.

There is thus provided in accordance with a preferred embodiment of the present invention a method for load balancing requests on a network, the method including receiving a request from a requester having a requester network address at a first load balancer having a first load balancer network address, the request having a source address indicating the requestor network address and a destination address indicating the first load balancer network address, forwarding the request from the first load balancer to a second load balancer at a triangulation network address, the request source address indicating the requester network address and the destination address indicating the triangulation network address, the triangulation network address being associated with the first load balancer network address, and sending a response from the second load balancer to the requestor at the requester network address, the response having a source address indicating the first load balancer network address associated with the triangulation network address and a destination address indicating the first requestor network address.

Further in accordance with a preferred embodiment of the present invention the method includes maintaining the association between the triangulation network address and the first load balancer network address at either of the load balancers.

Still further in accordance with a preferred embodiment of the present invention the method includes maintaining the association between the triangulation network address and the first load balancer network address at the second load balancer, and communicating the association to the first load balancer.

Additionally in accordance with a preferred embodiment of the present invention the method includes directing the request from the second load balancer to a server in communication with the second load balancer, composing the response at the server, and providing the response to the second load balancer.

There is also provided in accordance with a preferred embodiment of the present invention a method for load balancing requests on a network, the method including determining the network proximity of a requester with respect to each of at least two load balancers, designating a closest one of the load balancers by ranking the load balancers by network proximity, and directing requests from the requestor to the closest load balancer.

Further in accordance with a preferred embodiment of the present invention the method includes directing requests from any source having a subnet that is the same as the subnet of the requestor to the closest load balancer.

Still further in accordance with a preferred embodiment of the present invention the method includes monitoring the current load of each of the load balancers, and performing the directing step the current load of the closest load balancer is less than the current load of every other of the load balancers.

Additionally in accordance with a preferred embodiment of the present invention the determining step includes periodically determining.

Moreover in accordance with a preferred embodiment of the present invention the determining step includes determining at at least one fixed time.

Further in accordance with a preferred embodiment of the present invention the determining step includes polling the requestor to yield at least two attributes selected from the group consisting of: latency, relative TTL, and number of hops to requestor.

Still further in accordance with a preferred embodiment of the present invention the determining step includes polling the requestor using at least two polling methods selected from the group consisting of: pinging, sending a TCP ACK message to the requestor's source address and port, sending a TCP ACK message to the requestor's source address and port 80, and sending a UDP request to a sufficiently high port number as to elicit an "ICMP port unreachable" reply.

Additionally in accordance with a preferred embodiment of the present invention the designating step includes designating a closest one of the load balancers by ranking the load balancers by network proximity and either of current load and available capacity.

There is also provided in accordance with a preferred embodiment of the present invention a method for determining network proximity, the method including sending from each of at least two servers a UDP request having a starting TTL value to a client at a sufficiently high port number as to elicit an "ICMP port unreachable" reply message to at least one determining one of the servers indicating the UDP request's TTL value on arrival at the client, determining a number of hops from each of the servers to the client by subtracting the starting TTL value from the TTL value on arrival for each of the servers, and determining which of the servers has fewer hops of the client, and designating the server having fewer hops as being closer to the client than the other of the servers.

There is additionally provided in accordance with a preferred embodiment of the present invention a network load balancing system including a network, a first load balancer connected to the network and having a first load balancer network address, a second load balancer connected to the network and having a triangulation network address, the triangulation network address being associated with the first load balancer network address, and a requestor connected to the network and having a requester network address, where the requestor is operative to send a request via the network to the first load balancer, the request having a source address indicating the requestor network address and a destination address indicating the first load balancer network address, the first load balancer is operative to forward the request to the second load balancer at the triangulation network address, the request source address indicating the requestor network address and the destination address indicating the triangulation network address, and the second load balancer is operative to send a response to the requester at the requester network address, the response having a source address indicating the first load balancer network address associated with the triangulation network address and a destination address indicating the first requestor network address.

Further in accordance with a preferred embodiment of the present invention either of the load balancers is operative to maintain a table of the association between the triangulation network address and the first load balancer network address.

Still further in accordance with a preferred embodiment of the present invention the second load balancer is operative to maintain a table of the association between the triangulation network address and the first load balancer network address and communicate the association to the first load balancer.

Additionally in accordance with a preferred embodiment of the present invention the system further includes a server in communication with the second load balancer, where the second load balancer is operative to direct the request from the second load balancer to the server, and the server is operative to compose the response and provide the response to the second load balancer.

There is also provided in accordance with a preferred embodiment of the present invention a network load balancing system including a network, at least two load balancers connected to the network, and a requester connected to the network, where each of the at least two load balancers is operative to determine the network proximity of the requester, and at least one of the load balancers is operative to designate a closest one of the load balancers by ranking the load balancers by network proximity and direct requests from either of the requestor and a subnet of the requestor to the closest load balancer.

Further in accordance with a preferred embodiment of the present invention the load balancers are operative to poll the requestor to yield at least two attributes selected from the group consisting of: latency, relative TTL, and number of hops to requester.

Still further in accordance with a preferred embodiment of the present invention the load balancers are operative to poll the requester using at least two polling methods selected from the group consisting of: pinging, sending a TCP ACK message to the requestor's source address and port, sending a TCP ACK message to the requestor's source address and port 80, and sending a UDP request to a sufficiently high port number as to elicit an "ICMP port unreachable" reply.

Additionally in accordance with a preferred embodiment of the present invention at least one of the load balancers is operative to designate the closest one of the load balancers by ranking the load balancers by network proximity and either of current load and available capacity.

It is noted that throughout the specification and claims the term "network proximity" refers to the quality of the relationship between a client and a first server or server farm as compared with the relationship between the client and a second server or server farm when collectively considering multiple measurable factors such as latency, hops, and server processing capacity.

BRIEF DESCRIPTION OF THE DRAWINGS

The present invention will be understood and appreciated from the following detailed description, taken in conjunction with the drawings in which:

FIGS. 2A–2F, taken together, are simplified pictorial flow illustrations of a network proximity load balancing system constructed and operative in accordance with another preferred embodiment of the present invention.

DETAILED DESCRIPTION OF PREFERRED EMBODIMENTS

Figure 1A:
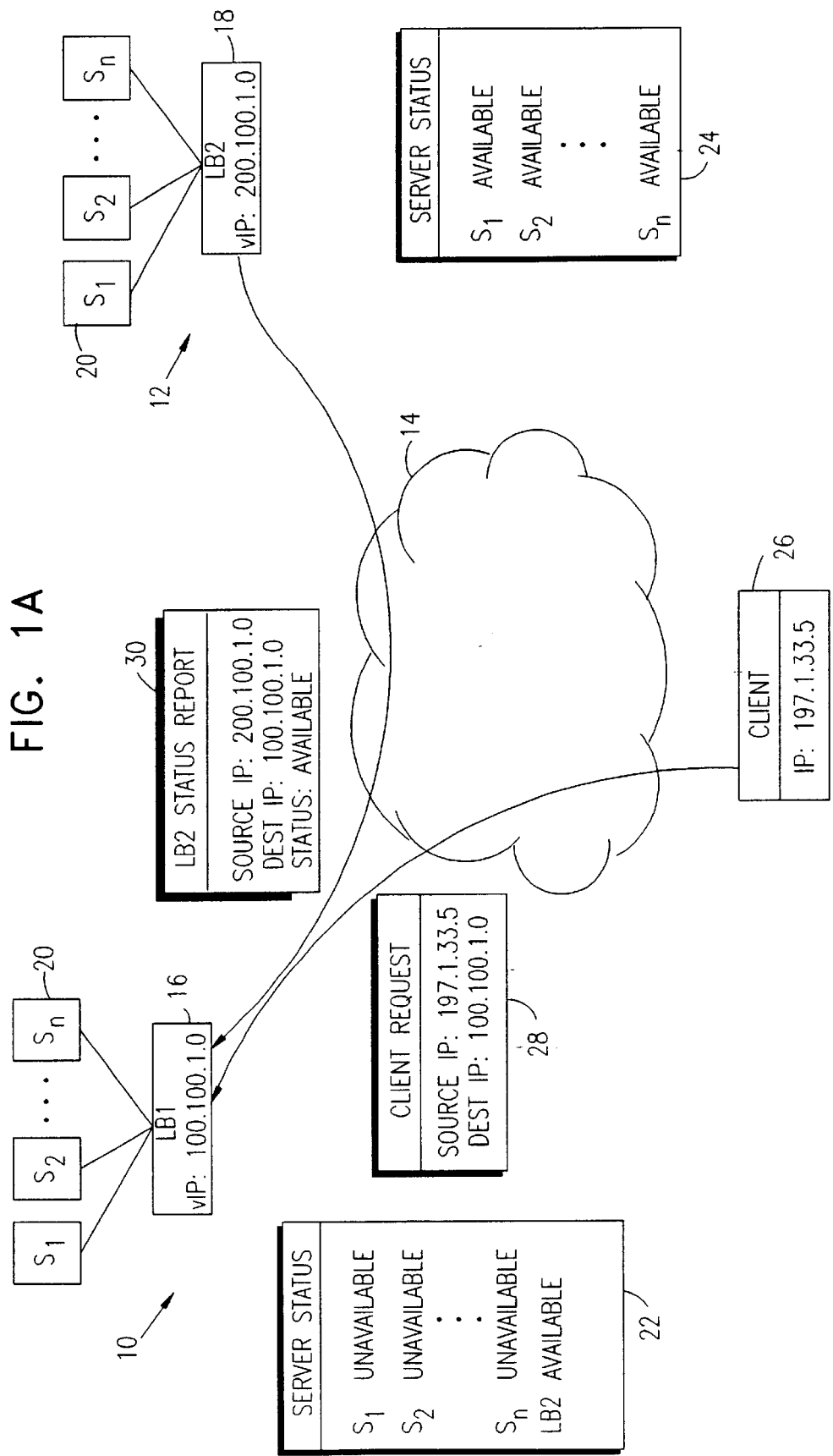
FIGS. 1A–1C, taken together, are simplified pictorial flow illustrations of a triangulation load balancing system constructed and operative in accordance with a preferred embodiment of the present invention.
Figure 1B:
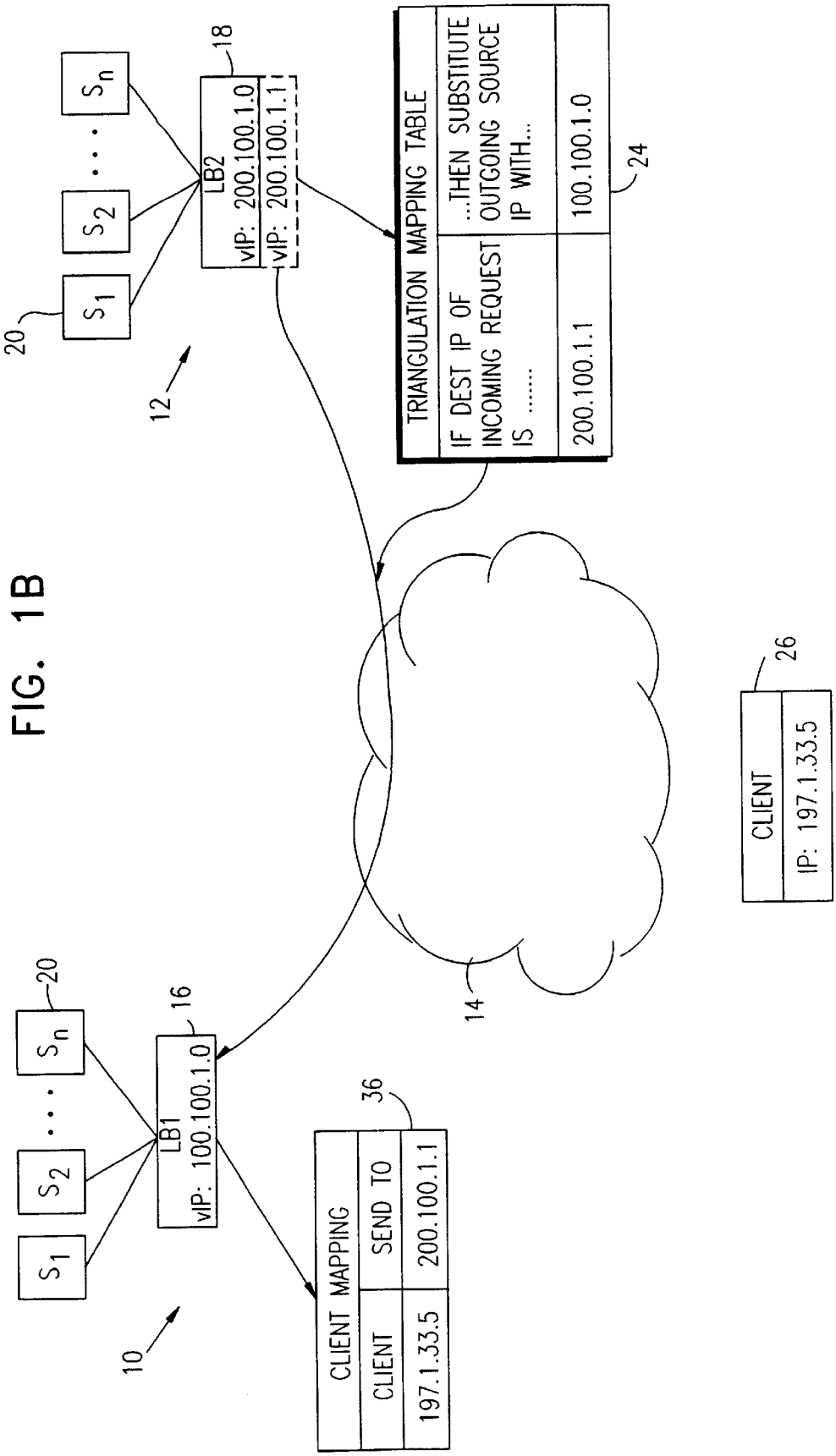
Figure 1C:
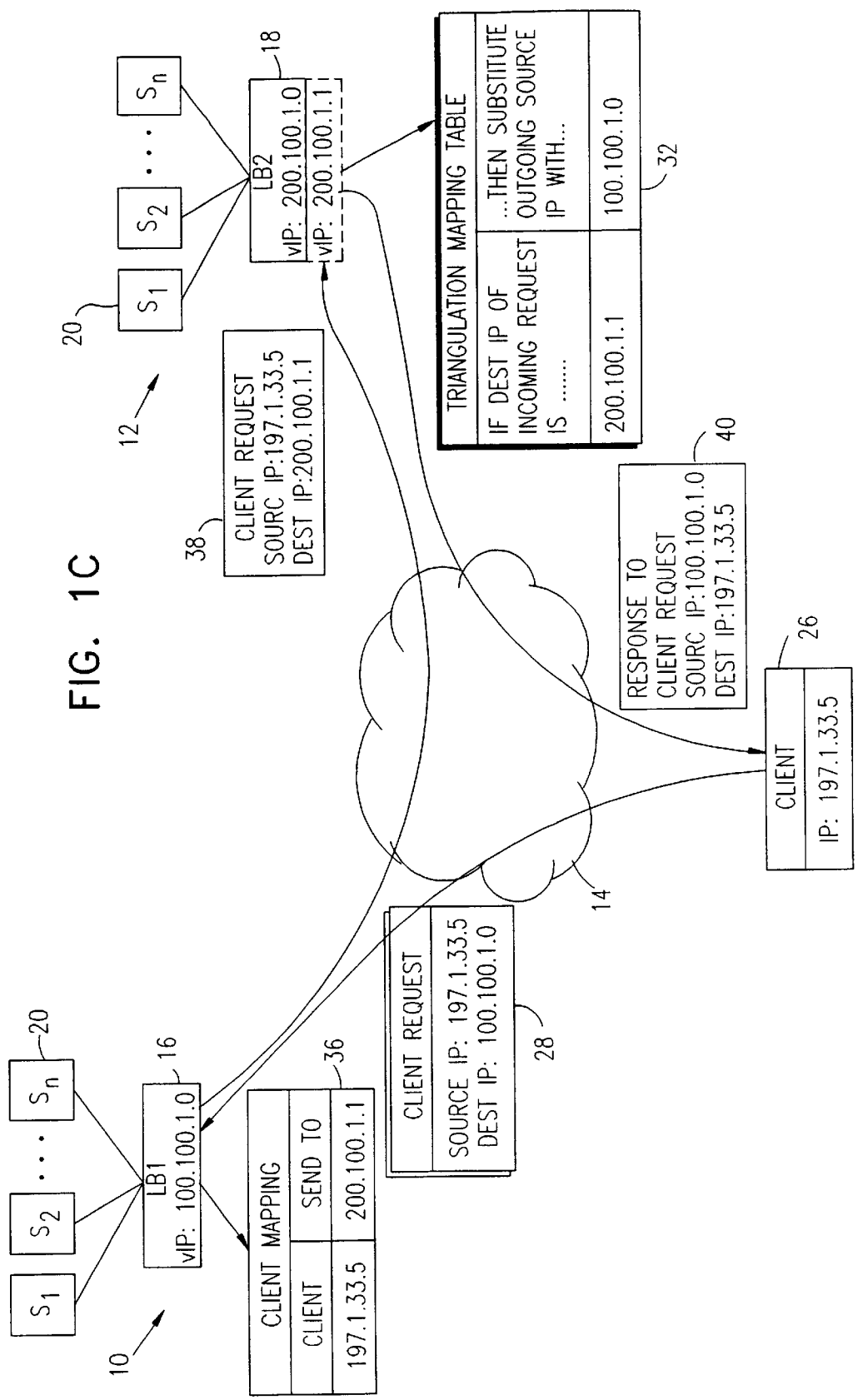

Reference is now made to FIGS. 1A–1C which, taken together, are simplified pictorial flow illustrations of a triangulation load balancing system constructed and operative in accordance with a preferred embodiment of the present invention. Two server farms, generally designated 10 and 12 respectively, are shown connected to a network 14, such as the Internet, although it is appreciated that more than two server farms may be provided. Server farms 10 and 12 typically comprise a load balancer 16 and 18 respectively, which may be a dedicated load balancer or a server or router configured to operate as a load balancer, with each of the load balancers being connected to one or more servers 20. Load balancers 16 and 18 are alternatively referred to herein as LB1 and LB2 respectively. LB1 and LB2 typically maintain a server status table 22 and 24 respectively, indicating the current load, configuration, availability, and other server information as is common to load balancers. LB1 and LB2 also typically periodically receive and maintain each other's overall status and load statistics such that LB1 and LB2 can know each other's availability.

Typical operation of the triangulation load balancing system of FIGS. 1A–1C is now described by way of example. As is shown more particularly with reference to FIG. 1A, a client 26, such as any known computer terminal configured for communication via network 14, is shown sending a request 28, such as an FTP or HTTP request, to LB1 whose virtual IP address is 100.100.1.0. In accordance with network transmission protocols, request 28 indicates the source IP address of the requester, being the IP address 197.1.33.5 of client 26, and the destination IP address, being the virtual IP address 100.100.1.0 of LB1. LB2 preferably periodically sends a status report 30 to LB1, the virtual IP address 100.100.1.0 of LB1 being known in advance to LB2. Status report 30 typically indicates the availability of server farm 12 and provides load statistics, which LB1 maintains.

LB2 is preferably capable of having multiple virtual IP addresses as is well known. It is a particular feature of the present invention for LB2 to designate a currently unused virtual IP address, such as 200.100.1.1, for LB1's use and store the mapping between the IP address of LB1 and the designated IP address in a triangulation mapping table 32, as is shown more particularly with reference to FIG. 1B. The designated address is referred to herein as the triangulation address and may be preconfigured with LB1 or periodically provided to LB1 from LB2. LB1 preferably maintains in a client mapping table 36 a mapping of the IP address 197.1.33.5 of client 26 and the triangulation address 200.100.1.1 of LB2 to which client 26's requests may be redirected.

As shown in the example of FIG. 1A, server status table 22 of LB1 indicates that no servers in server farm 10 are available to service client 26's request, but indicates that server farm 12 is available. Having decided that client 26's request should be forwarded to LB2, in FIG. 1C LB1 substitutes the destination IP address of request 28 with the virtual IP address 200.100.1.1 of LB2 which is now mapped to the IP address of client 26 as per client mapping table 36 and sends an address-modified client request 38 to LB2. LB2, upon receiving request 38 at its virtual IP address 200.100.1.1, checks triangulation mapping table 32 and finds that virtual IP address 200.100.1.1 has been designated for LB1's use. LB2 therefore uses the virtual IP address 100.100.1.0 of LB1 as per triangulation mapping table 32 as the source IP address of an outgoing response 40 that LB2 sends to client 26 after the request has been serviced by one of the servers in server farm 12 selected by LB2. It is appreciated that response 40 must appear to client 26 to come from LB1, otherwise client 26 will simply ignore response 40 as an unsolicited packet. Client 26 may continue to send requests to LB1 which LB1 then forwards requests to LB2 at the designated triangulation address. LB2 directs requests to an available server and sends responses to client 26 indicating LB1 as the source IP address.

Reference is now made to FIGS. 2A–2F which, taken together, are simplified pictorial flow illustrations of a network proximity load balancing system constructed and operative in accordance with another preferred embodiment of the present invention. The configuration of the system of FIGS. 2A–2F is substantially similar to FIGS. 1A–1C except as otherwise described hereinbelow. For illustration purposes, a third server farm, generally designated 50, is shown connected to network 14, although it is appreciated that two or more server farms may be provided. Server farm 50 typically comprises a load balancer 52, which may be a dedicated load balancer or a server or router configured to operate as a load balancer, with load balancer 52 being connected to two or more servers 20. Load balancer 52 is alternatively referred to herein as LB3.

Typical operation of the network proximity load balancing system of FIGS. 2A–2F is now described by way of example. As is shown more particularly with reference to FIG. 2A, client 26 is shown sending request 28, such as an FTP or HTTP request, to LB1 whose virtual IP address is 100.100.1.0. LB1 preferably maintains a proximity table 54 indicating subnets and the best server farm site or sites to which requests from a particular subnet should be routed. Determining the "best" site is described in greater detail hereinbelow.

Upon receiving a request, LB1 may decide to service the request or not based on normal load balancing considerations. In any case, LB1 may check proximity table 54 for an entry indicating the subnet corresponding to the subnet of the source IP address of the incoming request. As is shown more particularly with reference to FIG. 2B, if no corresponding entry is found in proximity table 54, LB1 may send a proximity request 56 to LB2, and LB3, whose virtual IP addresses are known in advance to LB1. Proximity request 56 indicates the IP address of client 26.

A "network proximity" may be determined for a requester such as client 26 with respect to each load balancer/server farm by measuring and collectively considering various attributes of the relationship such as latency, hops between client 26 and each server farm, and the processing capacity and quality of each server farm site. To determine comparative network proximity, LB1, LB2, and LB3 preferably each send a polling request 58 to client 26 using known polling mechanisms. While known polling mechanisms included pinging client 26, sending a TCP ACK message to client 26 may be used where pinging would otherwise fail due to an intervening firewall or NAT device filtering out a polling message. A TCP ACK may be sent to the client's source IP address and port. If the client's request was via a UDP connection, a TCP ACK to the client's source IP address and port 80 may be used. One or both TCP ACK messages should bypass any intervening NAT or firewall and cause client 26 to send a TCP RST message, which may be used to determine both latency and TTL. While TTL does not necessarily indicate the number of hops from the client to the load balancer, comparing TTL values from LB1, LB2, and LB3 should indicate whether it took relatively more or less hops.

Another polling method involves sending a UDP request to a relatively high port number at the client, such as 2090. This request would typically be answered with an "ICMP port unreachable" reply which would indicate the TTL value of the UDP request on arrival at the client. Since the starting TTL value of each outgoing UDP request is known, the actual number of hops to the client may be determined by subtracting the TTL value on arrival at the client from the starting TTL value. A combination of pinging, TCP ACK, UDP, and other polling techniques may be used since any one polling request might fail.

Figure 2C:
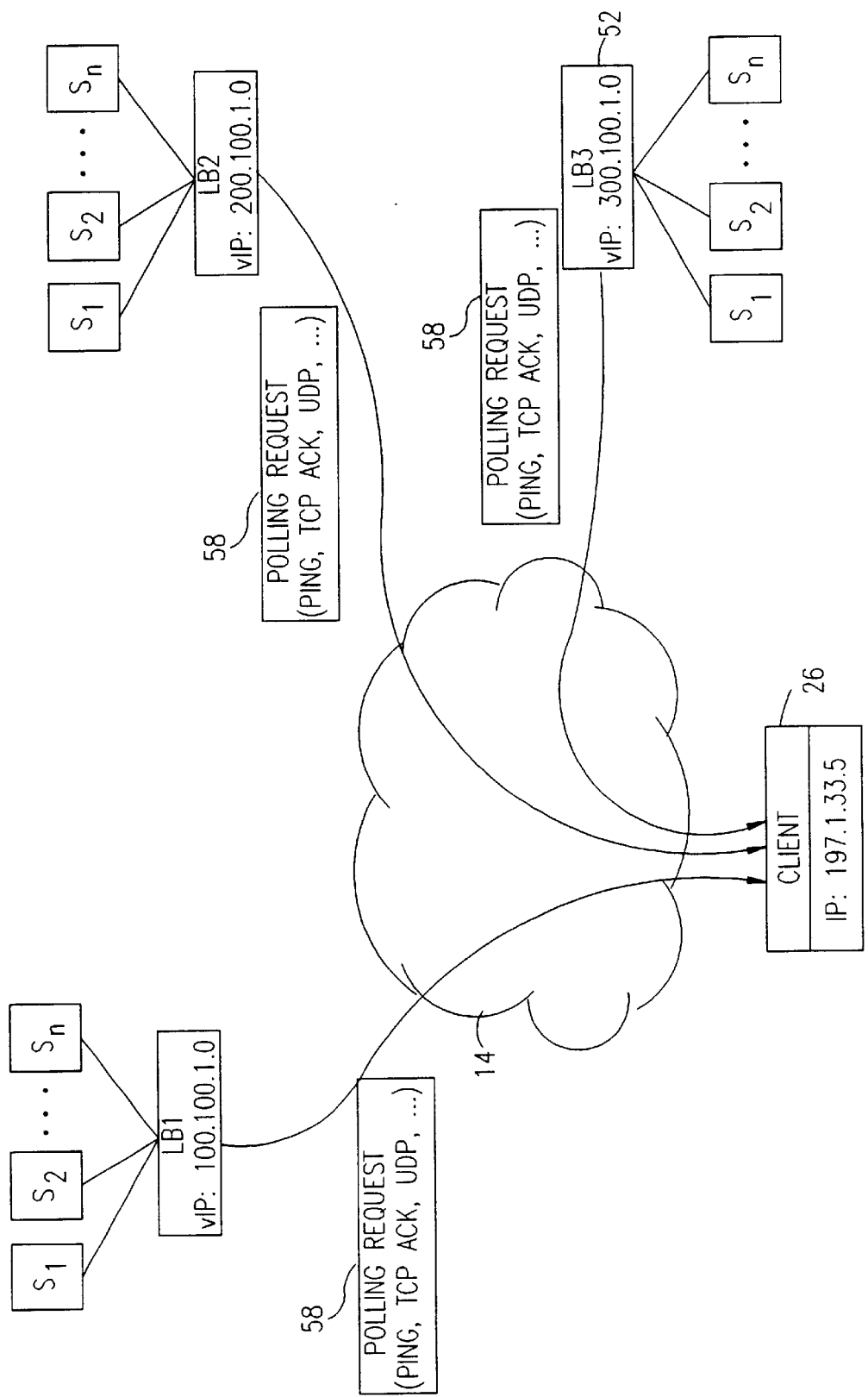
Figure 2D:
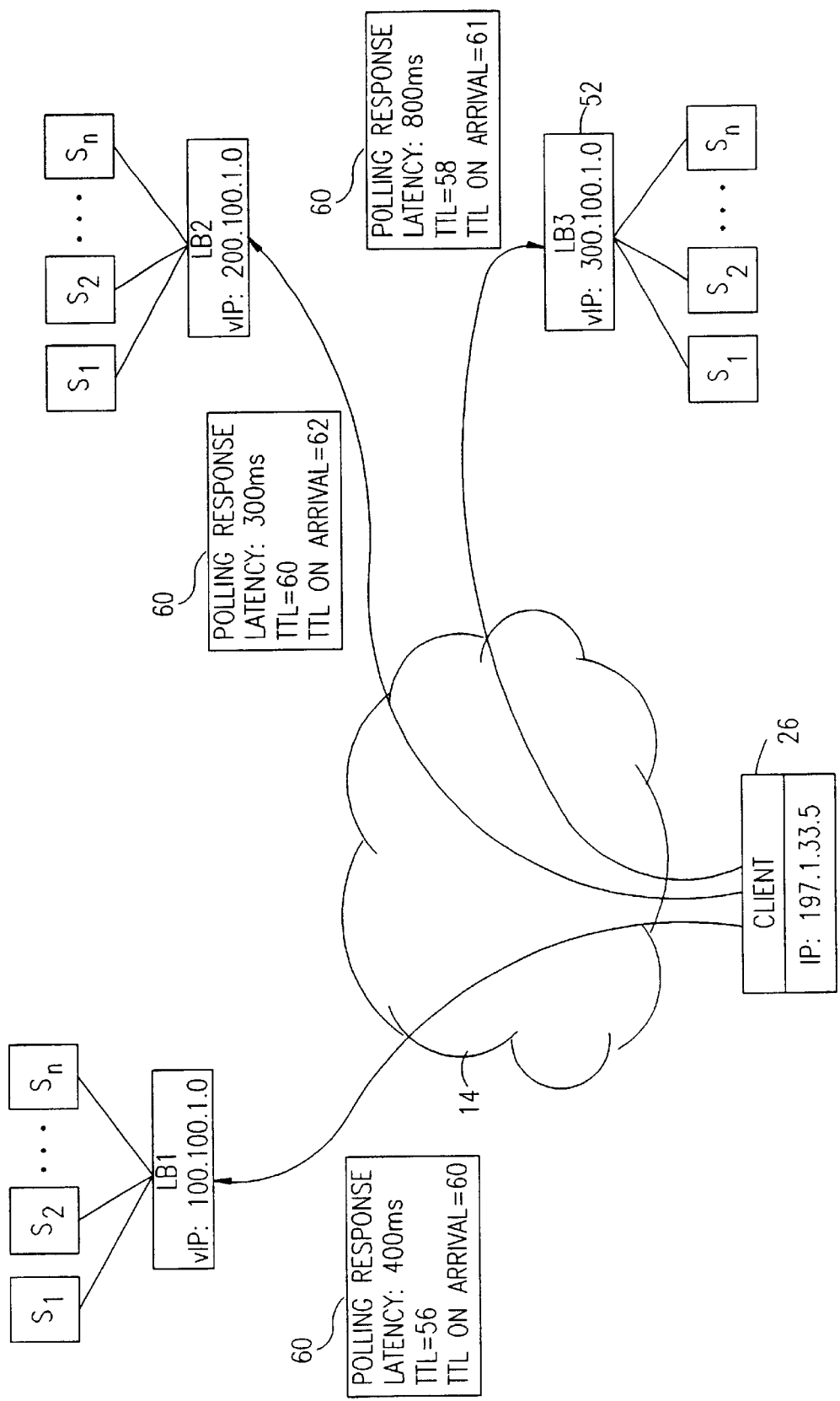

Client 26 is shown in FIG. 2D sending a polling response 60 to the various polling requests. The responses may be used to determine the latency of the transmission, as well as the TTL value. LB2 and LB3 then send polling results 62 to LB1, as shown in FIG. 2E. The polling results may then be compared, and LB1, LB2, and LB3 ranked, such as by weighting each attribute and determining a total weighted value for each server farm. Polling results may be considered together with server farm capacity and availability, such as may be requested and provided using known load balancing reporting techniques or as described hereinabove with reference to FIGS. 1A and 1B, to determine the server farm site that is "closest" to client 26 and, by extension, the client's subnet, which, in the example shown, is determined to be LB2. For example, the closest site may be that which has the lowest total weighted value for all polling, load, and capacity results. LB1 may then store the closest site to the client/subnet in proximity table 54.

As was described above, a load balancer that receives a request from a client may check proximity table 54 for an entry indicating the subnet corresponding to the subnet of the source IP address of the incoming request. Thus, if a corresponding entry is found in proximity table 54, the request is simply routed to the location having the best network proximity. Although the location having the best network proximity to a particular subnet may have already been determined, the load balancer may nevertheless decide to forward an incoming request to a location that does not have the best network proximity should a load report received from the best location indicate that the location is too busy to receive requests. In addition, the best network proximity to a particular subnet may be periodically redetermined, such as at fixed times or after a predetermined amount of time has elapsed from the time the last determination was made.

As is shown more particularly with reference to FIG. 2F, once the closest site for client 26 has been determined, client 26 may be redirected to the closest site using various methods. If a DNS request is received from client 26, LB1 may respond with LB2's address. If an HTTP request is received from client 26, HTTP redirection may be used. Alternatively, regardless of the type of request received from client 26, triangulation as described hereinabove with reference to FIGS. 1A–1C may be used.

It is appreciated that elements of the present invention described hereinabove may be implemented in hardware, software, or any suitable combination thereof using conventional techniques.

It is appreciated that the steps described with reference to FIGS. 1A–1C and 2A–2F need not necessarily be performed in the order shown unless otherwise indicated, and that in fact different implementations of the steps may be employed to yield similar overall results.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method for load balancing requests on a network, the method comprising:

receiving a request from a requester having a requestor network address at a first load balancer having a first load balancer network address, said request having a source address indicating said requester network address and a destination address indicating said first load balancer network address;

forwarding said request from said first load balancer to a second load balancer at a triangulation network address, said request source address indicating said requestor network address and said destination address indicating said triangulation network address, said triangulation network address being associated with said first load balancer network address; and sending a response from said second load balancer to said requester at said requestor network address, said response having a source address indicating said first load balancer network address associated with said triangulation network address and a destination address indicating said first requester network address.

2. A method according to claim 1 and further comprising:

maintaining said association between said triangulation network address and said first load balancer network address at either of said load balancers.

3. A method according to claim 1 and further comprising:

maintaining said association between said triangulation network address and said first load balancer network address at said second load balancer; and communicating said association to said first load balancer.

4. A method according to claim 1 and further comprising:

directing said request from said second load balancer to a server in communication with said second load balancer;

composing said response at said server; and providing said response to said second load balancer.

5. A network load balancing system comprising:

a network;

a first load balancer connected to said network and having a first load balancer network address;

a second load balancer connected to said network and having a triangulation network address, said triangulation network address being associated with said first load balancer network address; and a requestor connected to said network and having a requester network address, wherein said requestor is operative to send a request via said network to said first load balancer, said request having a source address indicating said requester network address and a destination address indicating said first load balancer network address, wherein said first load balancer is operative to forward said request to said second load balancer at said triangulation network address, said request source address indicating said requestor network address and said destination address indicating said triangulation network address, and wherein said second load balancer is operative to send a response to said requester at said requestor network address, said response having a source address indicating said first load balancer network address associated with said triangulation network address and a destination address indicating said first requester network address.

6. A system according to claim 5 wherein either of said load balancers is operative to maintain a table of said association between said triangulation network address and said first load balancer network address.

7. A system according to claim 5 wherein said second load balancer is operative to maintain a table of said association between said triangulation network address and said first load balancer network address and communicate said association to said first load balancer.

8. A system according to claim 5 and further comprising a server in communication with said second load balancer, wherein said second load balancer is operative to direct said request from said second load balancer to said server, and wherein said server is operative to compose said response and provide said response to said second load balancer.

* * * * *